(12) United States Patent
Hefele et al.

(10) Patent No.: US 7,780,754 B2
(45) Date of Patent: Aug. 24, 2010

(54) RAPID-ACTION CONNECTION ELEMENT WITH A FILTER

(75) Inventors: Christian Hefele, Breitenbrunn (DE); Peter Froehlich, Landsberg (DE); Franz Heiberger, Stettfurt (CH)

(73) Assignee: Hilti Aktiengesellschaft, Schaan (LI)

( * ) Notice: Subject to any disclaimer, the term of this patent is extended or adjusted under 35 U.S.C. 154(b) by 991 days.

(21) Appl. No.: 11/519,323

(22) Filed: Sep. 11, 2006

(65) Prior Publication Data
US 2008/0012312 A1 Jan. 17, 2008

(30) Foreign Application Priority Data
Sep. 22, 2005 (DE) ........................ 10 2005 000 126

(51) Int. Cl.
*B01D 46/00* (2006.01)
(52) U.S. Cl. ............... 55/385.1; 81/57.44; 81/DIG. 12; 173/168; 173/169; 173/170; 227/130
(58) Field of Classification Search ................ 55/385.1, 55/503, 504, 505, 418, DIG. 17; 81/57.44, 81/DIG. 12; 173/168, 169, 170; 227/130; 95/273
See application file for complete search history.

(56) References Cited

U.S. PATENT DOCUMENTS 5,637,125 A * 6/1997 Amada ...................... 55/385.1
5,951,728 A 9/1999 Hopson
6,221,306 B1 * 4/2001 Johnson ..................... 264/572
6,554,879 B1 * 4/2003 Nomura ..................... 55/385.1
7,407,530 B2 * 8/2008 Chen ........................... 95/147
2006/0086072 A1 * 4/2006 Ho et al. .................... 55/385.1
2006/0162302 A1 * 7/2006 Terrell ....................... 55/385.1
2007/0251199 A1 * 11/2007 Valentini .................... 55/385.1
2009/0038277 A1 * 2/2009 Huang ....................... 55/385.1

FOREIGN PATENT DOCUMENTS

AU 751181 8/2002

* cited by examiner

*Primary Examiner*—Duane Smith
*Assistant Examiner*—Minh-Chau T Pham
(74) *Attorney, Agent, or Firm*—Abelman, Frayne & Schwab

(57) ABSTRACT

A rapid-action connection element for a compressed air hose (3) includes a filter (5) located in the discharge casing (4) for sealing a flow cross-section, a flow-through pressure piston (7) extending, at least partially into the discharge casing (4) and displaceable, within limits between outward position remote from the filter (5) in which the pressure piston (7) is sealed with respect to the discharge casing (4), and an inward position adjacent to the filter (5) in which the pressure piston (7) is open with respect to the discharge casing (4) for flow therebetween, and a flow-through rapid-action coupling member (6a) connected with the pressure piston (7).

7 Claims, 2 Drawing Sheets

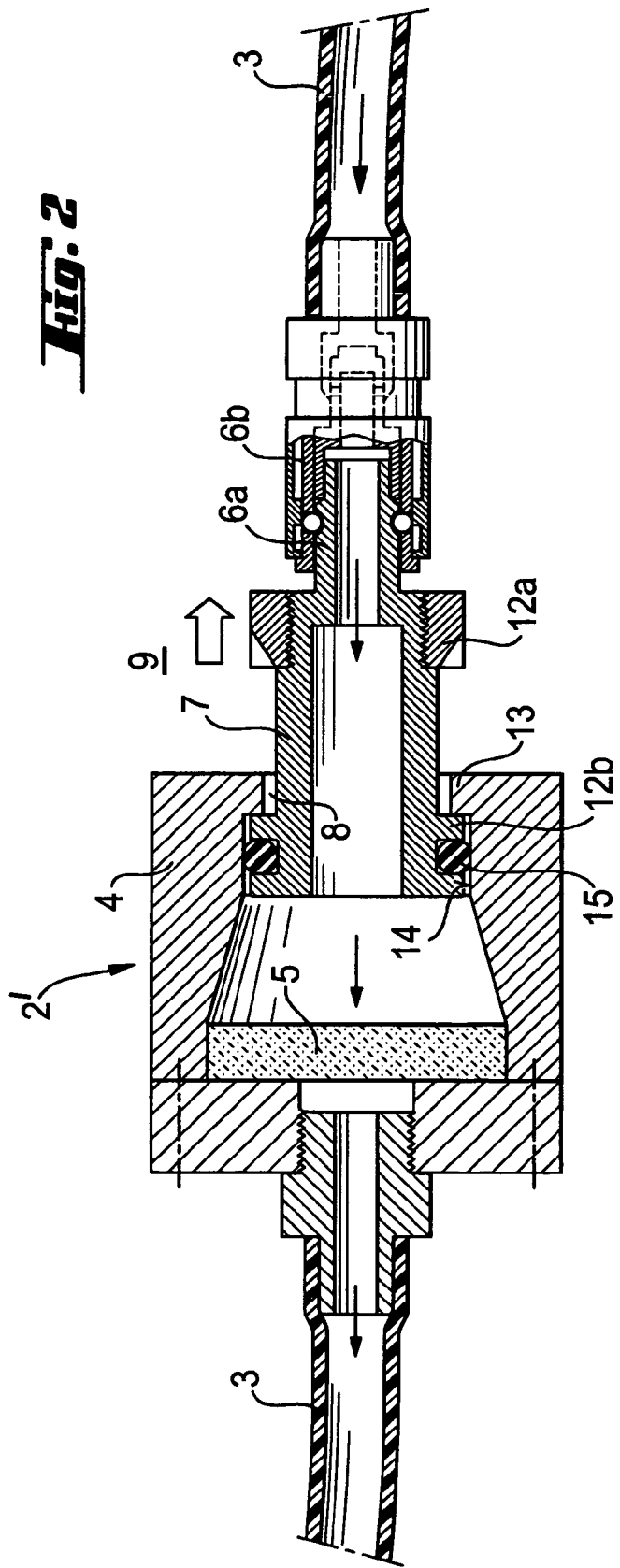

RAPID-ACTION CONNECTION ELEMENT WITH A FILTER

BACKGROUND OF THE INVENTION

1. Field of the Invention

Figure 1:
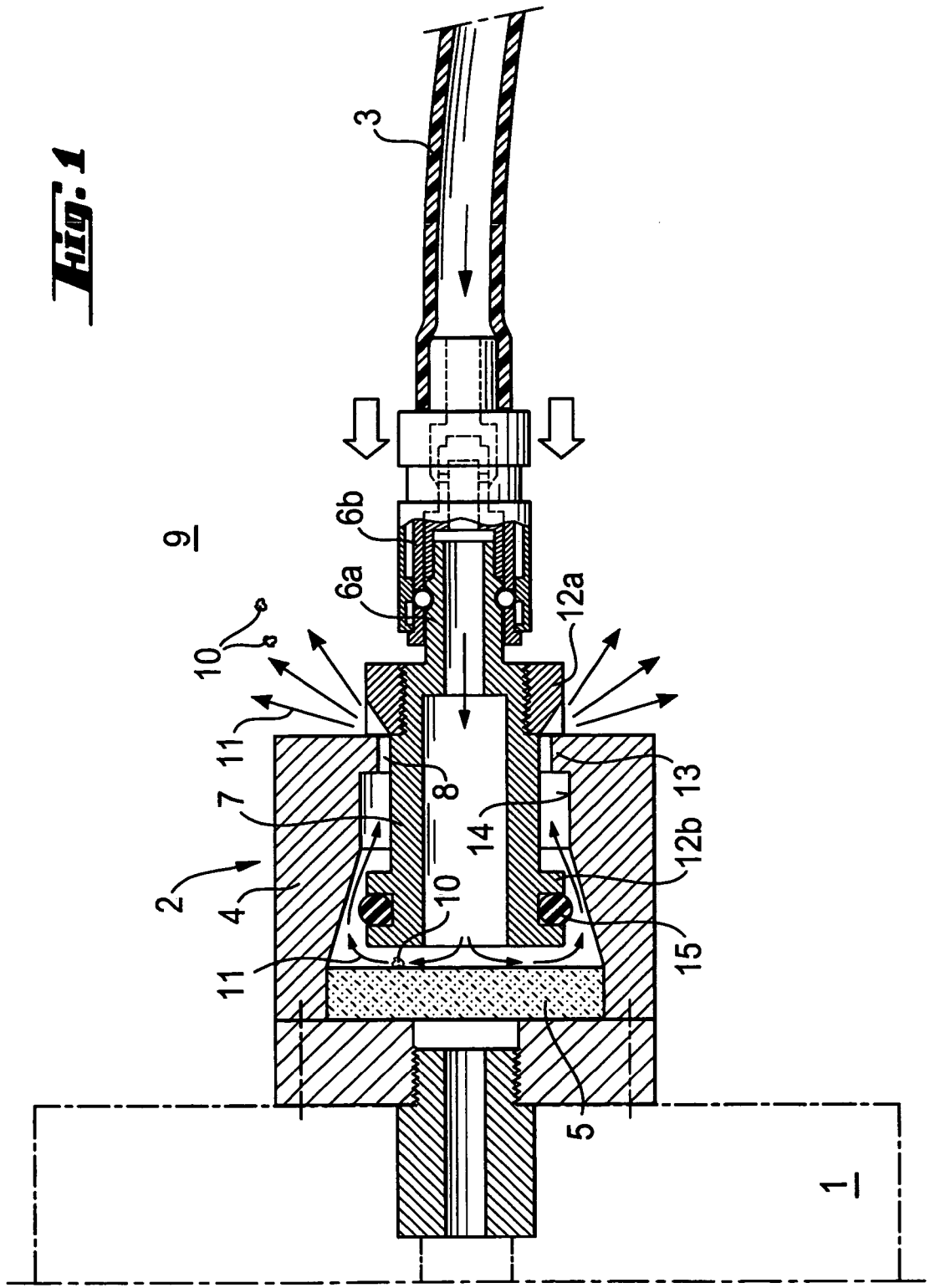

The present invention relates to a rapid-action connection element for a compressed air hose and having a filter, in particular, for use with compressed air-driven hand-held power tools.

2. Description of the Prior Art

Rapid-action connection elements of the type described above, are used for connection of a pneumatic consumer with a pressure source. Thus, with a corresponding use of the rapid-action connection element, the pressure medium always flows therethrough in the direction form the pressure source to the pneumatic consumer.

A rapid-action connection element for a compressed air hose for use in compressed air-driven hand-held tools is disclosed in European Publication EP 0 990 829.

European Publication EP 0 146 997 discloses a rapid-action connection element with a filter integrated therein. The filter can be contaminated and clogged, whereby passing of a flow medium therethrough is blocked. The necessary exchange of the filter causes stoppage of the hand-held power tool.

German Publication DE 197 13 819 discloses a rapid-action connection element with a check valve, and a filter which is formed as a self-cleaning filter by using an integrated displaceable fluidic body of a flow display. A flow display that occupies additional space is not suitable for compressed air-driven hand-held power tools.

Accordingly, an object of the present invention is a rapid-action connection element with a self-cleaning filter for use in compressed air-driven power tools.

SUMMARY OF THE INVENTION

This and other objects of the present invention, which will become apparent hereinafter, are achieved with a rapid-action connection element including a flow-through discharge casing, a filter located in the discharge casing for sealing a flow cross-section, with a compressed air flow being filtered therethrough, and a flow-through pressure piston extending, at least partially, into the discharge casing and displaceable, within limits in opposite directions. The pressure piston has an outward position remote from the filter in which the pressure piston is sealed with respect to the discharge casing, and an inward position adjacent to the filter in which the pressure piston is open with respect to the discharge casing for flow of pressure medium therebetween. The connection element also includes a flow-through rapid-action coupling member connected with the pressure piston.

Because during the coupling process, the coupling member, together with the counter-coupling member and the pressure piston, are displaced toward the filter to the inward position of the pressure piston, the flow gap between pressure piston and the discharge casing opens. The pressure medium, which flows from the pressure source through the compressed air hose and the pressure piston and against the filter, is deflected at the filter and flows through the gap between the pressure piston and the discharge casing into environment. Dirt particles, which accumulated on the pressure side of the filter, are loosened by the flow pulse and are torn away, being removed by the stream into the environment. As soon as the coupling process ends, the built-up, in the discharge casing, inner pressure displaces the pressure piston to its outward position and, as a result, the pressure piston becomes sealed with respect to the discharge casing. Thus, self-cleaning of the filter is effected at each coupling process which takes place regularly in the hand-held power tools.

Advantageously, the pressure piston has, at its filter-side end, an extending radially outwardly, stop flange, and the discharge casing has an extending radially inwardly, counter-stop flange fittingly cooperating with the stop flange of the pressure piston. Thereby, a suitable end stop for the outward position of the pressure piston is provided. Preferably, the pressure piston also has, at its coupling member-end, an extending radially outwardly stop flange with which the counter-stop flange of the discharge casing fittingly cooperates. This provides for a suitable end stop for the inward position of the pressure piston.

Advantageously, both the pressure piston and a pressure surface of the discharge casing that seals the pressure piston against the discharge casing, are formed rotationally symmetrical. This insures a rotational degree of freedom at the corresponding connection with the compressed air hose, with the sealing being retained.

Advantageously, the pressure piston has its own sealing means and more advantageously, an elastic O-ring, which insures an appropriate sealing at a minimal pivotal movement of the pressure piston relative to the discharge casing.

Advantageously, the rapid-action connection element is fixedly connected with a hand-held power tool, which insures a delivery of a sufficient amount of the filtered pressure medium to the power tool.

Alternatively, the rapid-action connection element is directly connected with the pressure medium hose, whereby a filtering hose coupling is formed.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiment, when read with reference to the accompanying drawings.

BRIEF DESCRIPTION OF TH DRAWINGS

The drawings show:

FIG. 1 a longitudinal cross-sectional view of a rapid-action connection element during the connection process; and FIG. 2 a longitudinal cross-sectional view of a rapid-action connection element during use.

DETAILED DESCRIPTION OF THE PREFERRED EMBODIMENTS

A rapid-action connection element 2, which is secured on a hand-held power tool 1, shown with a dash-dot line, and is shown in FIG. 1, has a discharge casing 4 for a compressed air hose 3, a filter 5 located in the discharge casing 4 and sealing the flow cross-section, and a flow-through coupling member 6a. The rapid-action coupling member 6a, which is connectable with a counter-coupling member 6b of the compression air hose 3, is connected with a flow-through pressure piston 7. The pressure piston 7 extends into the discharge housing 4 with a possibility of limited displacement in opposite directions, with its outlet opening being open toward the discharge housing 4 in its inward position adjacent to the filter 5. Pressure medium in form of compressed air flows from a pressure source, not shown, through the compressed air hose 3 and the pressure piston 7 against the filter 5. At the filter 5, the pressure medium deviates and flows into environment 9 through a gap 8 between the pressure piston 7 and the discharge casing 4. Thereby, dirt particles 10, which accumulate on the pressure side of the filter 5, become loose as a result of a flow pulse, are torn away by the stream 11 and are carried by the stream 11 into the environment 9. At both its opposite ends, the pressure piston 7 has projecting radially outwardly, stop flanges 12a/12b$_2$, with which a radially inwardly projecting counter-stop flange 13 of the discharge casing 4 is associated. The pressure piston 7 and the sealing pressure surface 14 of the discharge casing 4, which cooperates with the pressure piston 7, are both formed rotationally symmetrical. The pressure piston 7 has separate sealing means 15 in form of an elastic O-ring. The elastic O-ring is formed of silicone resin.

According to FIG. 2, a rapid-action connection element 2', which is formed as a hose coupling, is directly connected with the compressed air hose 3. The pressure piston 7, which is displaced in opposite direction within some limits, is shown in its outer position (as shown) remote from the filter 5 and is sealed with respect to the discharge casing 4.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A rapid-action connection element for a compressed air hose (3), comprising a flow-through discharge casing (4); a filter (5) located in the discharge casing (4) for sealing a flow cross-section with a compressed air flow being filtered therethrough; a flow-through pressure piston (7) extending, at least partially into the discharge casing (4), displaceable, within limits, in opposite directions, and having an outward position remote from the filter (5) in which the pressure piston (7) is sealed with respect to the discharge casing (4), and an inward position adjacent to but spaced from the filter (5) in which the pressure piston (7) is open with respect to the discharge casing (4) for flow of the medium therebetween; and a flow-through rapid-action coupling member (6a) connected with the pressure piston (7).

2. A rapid-action connection element according to claim 1, wherein the pressure piston (7) has, at a filter-side end thereof, an extending radially outwardly, stop flange (12a), and the discharge casing (4) has an extending radially inwardly, counter-stop flange (13) fittingly cooperating with the stop flange of the pressure piston (7).

3. A rapid-action connection element according to claim 2, wherein the pressure piston (7) has, at a coupling member-end thereof an extending radially outwardly stop flange (12b) with which the counter-stop flange (13) of the discharge casing (4) fittingly cooperates.

4. A rapid-action connection element according to claim 1, wherein both the pressure piston (7) and a pressure surface (14) that seals the pressure piston (7) against the discharge casing (4) are formed rotationally symmetrical.

5. A rapid-action connection element according to claim 1, wherein the, pressure piston (7) has separate sealing means (15).

6. A rapid-action connection element according to claim 1, comprising means for connecting the connection element (2) with a hand-held power tool (1).

7. A rapid-action connection element according to claim 1, comprising means for directly connecting the connection element with the compressed air hose (3).

\* \* \* \* \*